United States Patent [19]

Murakami et al.

[11] 4,290,994
[45] Sep. 22, 1981

[54] METHOD OF MOLDING HOLLOW BODIES

[75] Inventors: Kenkichi Murakami, Osaka; Yoshiharu Kikuzawa, Takarazuka, both of Japan

[73] Assignee: Kabushiki Kaisha Plastic Kogaku Kenkyusho, Osaka, Japan

[21] Appl. No.: 147,284

[22] Filed: May 6, 1980

Related U.S. Application Data

[63] Continuation of Ser. No. 932,659, Aug. 10, 1978, abandoned.

[51] Int. Cl.³ .............................................. B29C 17/07
[52] U.S. Cl. .................... 264/515; 264/531; 264/536; 264/543; 425/531
[58] Field of Search .............. 264/515, 531, 536, 540, 264/542, 543; 425/523, 531

[56] References Cited

U.S. PATENT DOCUMENTS

| | | | |
|---|---|---|---|
| 3,275,726 | 9/1966 | Rudolph | 264/543 X |
| 3,329,996 | 7/1967 | Marcus et al. | 264/531 X |
| 3,457,337 | 7/1969 | Turner | 264/540 X |
| 3,579,622 | 5/1971 | Shaw et al. | 264/531 X |
| 3,632,261 | 1/1972 | Gasior et al. | 425/531 |
| 3,663,522 | 5/1972 | Butcher | 264/531 X |

FOREIGN PATENT DOCUMENTS 1109137  4/1968  United Kingdom ............... 264/536

*Primary Examiner*—Jan H. Silbaugh
*Attorney, Agent, or Firm*—Armstrong, Nikaido, Marmelstein & Kubovcik

[57] ABSTRACT

A method of molding hollow bodies by continuously downwardly extruding a melt of synthetic resin from a die to form a tubular parison, closing and sealing the free end of the parison, holding the parison, cutting the parison thereby forming a cut-off tube with a closed sealed end and blowing a fluid into the cut-off tube retained in the mold thereby forming a hollow body. Certain apparatus modifications are disclosed such that the step of closing and sealing comprises moving sealing members from outside the parison towards its center, bringing the sealing members into contact with each other while filling the resin of the free end into a space provided between the end of a mandrel extension and the sealing members. The holding step consists of holding a portion of the moving parison which becomes the cut-off tube by its outside surface. The method further comprises during the steps of cutting and sealing, moving the mechanism for forming the bottom, the mechanism for cutting, the mechanism for holding the cut-off tube, and the mandrel extension at substantially the same speed and in substantially the same direction as the movement of the parison extruded from the die.

8 Claims, 25 Drawing Figures

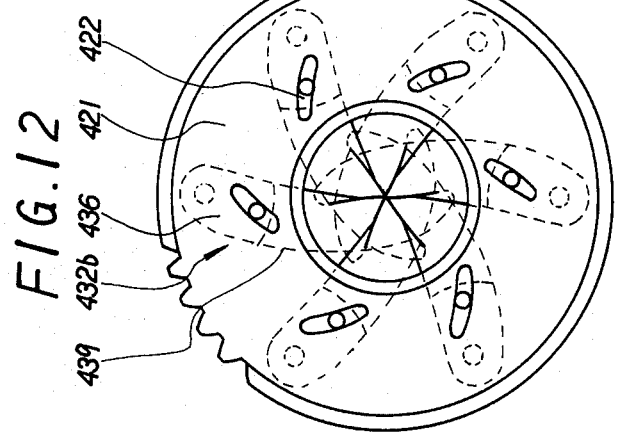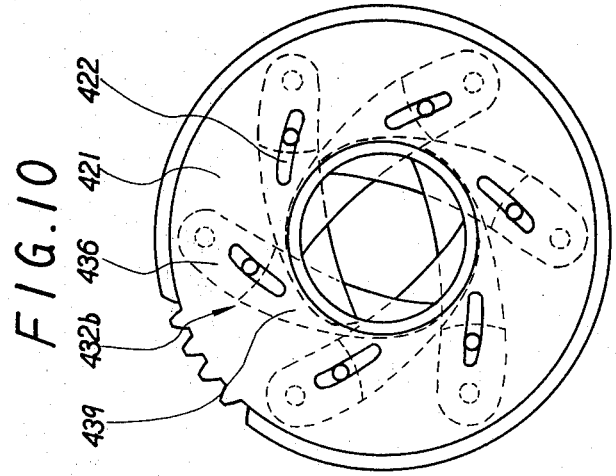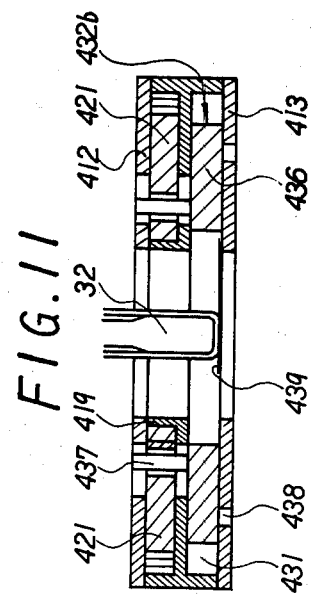

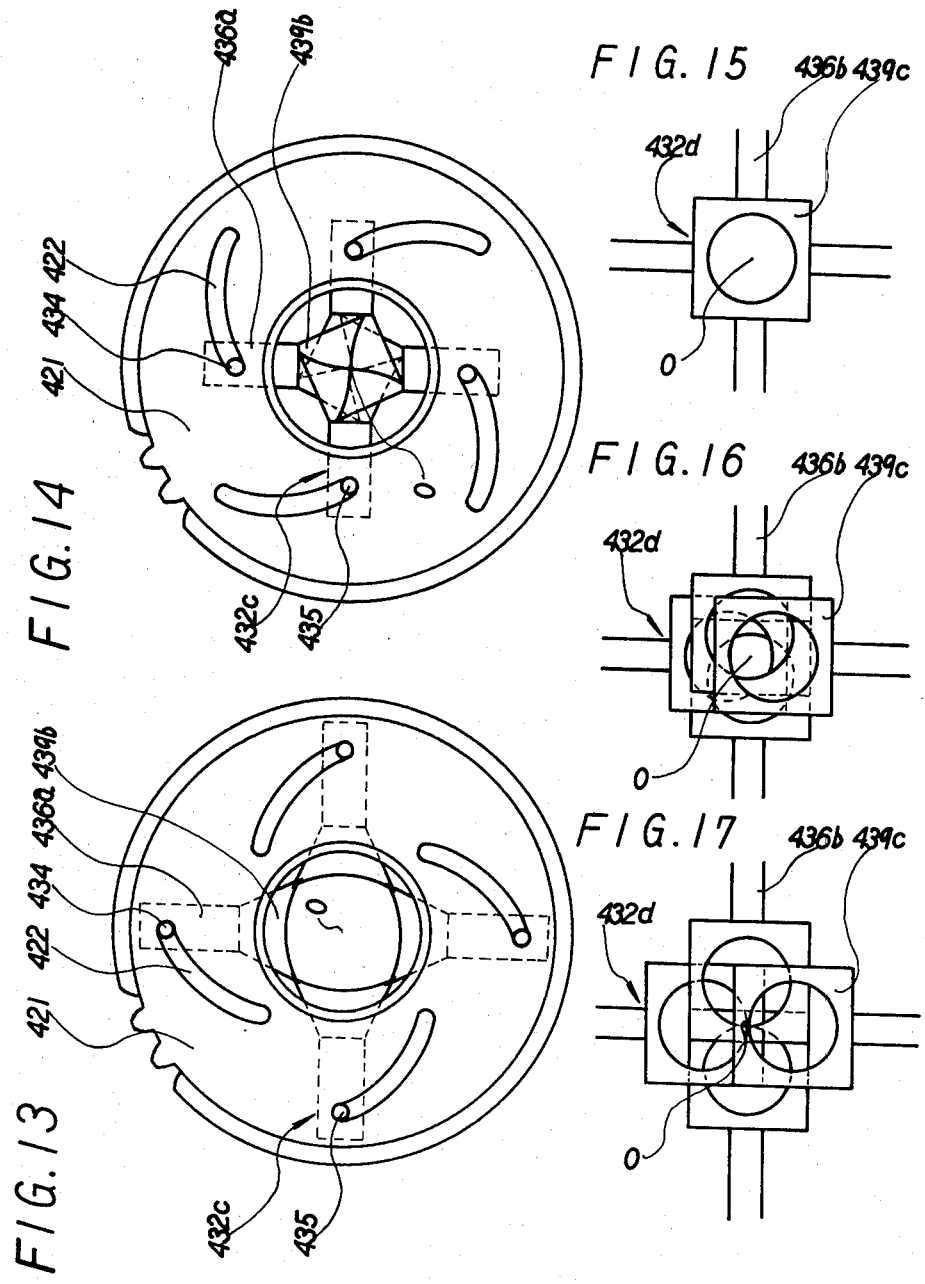

METHOD OF MOLDING HOLLOW BODIES

This is a continuation of application Ser. No. 932,659, filed Aug. 10, 1978, now abandoned.

BACKGROUND OF THE INVENTION

The present invention relates to a novel method of molding hollow bodies, and more particularly to a novel method of molding hollow bodies from a parison extruded from a die comprising the successive steps of holding the parison from outside at a position away from the die outlet in the direction of extrusion, cutting the parison at a position closer to the die than the holding position and sealing the cut end of the parison continuous with the die to form a bottom.

The extrusion blow molding process and injection blow molding process have heretofore been used as blow molding processes. Of these two processes, the latter has the advantages of forming hollow bodies with a bottom of neat finish and giving a reduced amount of scraps but involves the drawbacks of requiring a high equipment cost and an expensive mold and being unable to mold bottles with a small neck, namely being limited in the shape of moldable hollow bodies.

With the extrusion blow molding process, a bottomless parison extruded from a die is sealed at one end while being nipped by the pinch portion of a mold, and a fluid is then blown into the parison to form a hollow body. Accordingly the molded body usually has unsightly sealing traces and reduced strength at the sealed portion. Additionally an excess of the material remains in the form of a flash on the outer side of the body where it was nipped by the pinch portion of the mold, thus resulting in serious waste of material.

It is known to form the bottom of the parison with intimately fittable implements by holding them end to end from inside and outside of the bottom portion. Apparently a hollow body bottom portion of good appearance and strength can be formed with use of such intimately fittable implements without leaving any traces of sealing. With the known method, however, the bottom of the parison is formed at the die outlet as disclosed in Japanese Patent Publication No. 4149/1972. The method is still infeasible because of various difficulties as will be described below.

(1) When resin is filled into a closed space corresponding to the parison bottom and formed between the die outlet end portion and a mold pressed directly against the die end portion and shaped to provide the space, an insufficient or excessive amount of resin is likely to be placed into the space. In this case, the moment when a proper amount of resin has been charged by a feeder, the resin supply must be interrupted, or the mold must be removed while allowing the feeder to continuously supply the resin. The former method which resembles the method employed for usual injection molding is inefficient and requires a troublesome procedure since the extrusion of resin from the die is discontinuous. Accordingly the latter method is preferable to practice in ensuring the advantage of extrusion blow molding, but it is difficult to remove the mold with controlled timing.

(2) The die must be maintained at a high temperature to render the resin fully flowable, whereas the mold having a space corresponding to the parison bottom needs to be removed immediately on completion of the filling operation; otherwise the parison would not be extrudable integrally with the bottom. Thus the portion of the die for forming the bottom, namely the extremity of the mandrel, must be maintained at a low temperature to render the formed bottom releasable therefrom. Difficulty therefore arises in maintaining portions of the same die at greatly different temperatures.

Unlike the method as disclosed in the Japanese Patent Publication referred to above, it is possible to separate and thermally insulate the bottom forming portion from the die as is usually practiced in injection molding, but this method requires some time for the cooling of the formed bottom before releasing and is therefore inefficient as is the case with injection blow molding.

Further with usual molding processes, the parison is held by a holder or mold first and then cut at a position immediately above the holding position, whereupon the parison holder or mold is retracted downward or sidewise. When holding or cutting the parison, the holding means or cutter is held in a fixed position without travelling in the direction of movement of the parison, so that the position of the fixed holding means or cutter varies relative to the parison which constantly moves along in the direction of extrusion. Consequently when the parison is cut some time after it has been held, the parison will not be cut as desired due to the resulting slackening of the parison. Moreover if the parison holding means or mold is retracted with delayed timing after cutting, the following cut end of the parison sent forward from the die would advance into contact with the preceding end of the cut-off parison and adhere thereto.

OBJECTS OF THE INVENTION

An object of the present invention is to provide a method of molding hollow bodies in which the parison is cut and bottomed at a position away from the die outlet in the direction of extrusion, rather than at the die outlet, where the parison has been somewhat cooled by exposure to the atmosphere and where the bottom forming means to be brought into contact with the parison can be fully cooled. When the parison is cut and sealed at the cut end to form a bottom at the above-mentioned position, the bottom forming means to be brought into direct contact with the parison, such as sealing members movable from outside the parison toward its center into end-to-end contact with each other and the extremity of a mandrel extension, can be cooled as by circulation of water, while a sufficient time can be afforded for the formation of the bottom so that the bottom of the parison formed can be easily released from the forming means.

Another object of the invention is to provide a method of molding hollow bodies which minimizes the large quantity of scraps usually resulting from the conventional extrusion blow molding process and which therefore assures improved production efficiency and eliminates the labor required for the recovery of scraps.

Another object of the invention is to provide a method of molding hollow bodies with a neat finish free of any traces of bottom pinching-off that would usually result from the conventional extrusion blow molding process.

Another object of the invention is basically to overcome the problems of the conventional extrusion blow molding process and to thereby provide a method of molding hollow bodies which can be practiced with an apparatus exceedingly simpler in construction than injection blow molding apparatus without necessitating the use of a plurality of molds as required for injection blow molding, namely with a reduced initial investment especially on the mold.

Another object of the invention is to overcome the problems that the conventional multilayer blow molding process gives scraps of a plurality of materials in mixture in an amount of about 30% or more of the product and that such scraps are difficult to recycle, and to provide a method of molding hollow bodies in which scraps are up to about 10% of the product.

Another object of the invention is to overcome the problem of conventional multilayer blow molding process that difficulties are encountered in forming continuous layers of uniform thicknesses at the pinching-off portion with the likelihood of a break of layer which, when occurring in the adhesive layer, would lead to reduced bond strength and to the break of the product when it is dropped or which, when occurring in the gas or water vapor barrier layer, would entail reduced impermeability to gas or water vapor, and to provide a method of molding hollow bodies free from a pinching-off portion conventionally cut straight.

Another object of the invention is to overcome the problem of usual molding processes that when the parison is cut some time after it has been held, the parison will not be cut properly due to the resulting slackening of the parison and to provide a method of molding hollow bodies in which the parison holding position and cutting position are maintained at a definite spacing relative to each other to thereby prevent improper cutting due to the slackening of the parison.

Still another object of the invention is to overcome the problem encountered with usual molding processes that if the parison holding means or mold is retracted with delayed timing after the parison has been cut, the following cut end of the parison would advance into contact with the preceding end of the cut-off parison and adhere thereto, and to provide a method of molding hollow bodies in which the parison holding means is moved at a increasing spacing from the parison cutter relative thereto after the parison has been cut so that the following cut end of the parison will not adhere again to the preceding end of the cut-off parison, the parison cut ends thus being maintainable in a satisfactory state.

Other objects of the invention will become apparent from the following description and drawings.

BRIEF DESCRIPTION OF THE DRAWINGS

FIG. 10 is a fragmentary sectional view similar to FIG. 6 and showing another embodiment (members 432b) of the same means;

FIG. 11 is a fragmentary side elevation partly in section and similar to FIG. 4, the view showing the members 432b in FIG. 10 when a cam gear 421 has been rotated in a counterclockwise direction in the drawing;

FIG. 12 is a sectional view similar to FIG. 6 and showing the members 432b of FIG. 10 when the cam gear 421 has been rotated in a clockwise direction in the drawing;

FIG. 13 is a sectional view similar to FIG. 5 and showing another embodiment (members 432c) of the means shown in FIG. 5;

FIG. 14 is a sectional view similar to FIG. 5 and showing the members 432c in FIG. 13 when the cam gear 421 has been rotated in a clockwise direction in the drawing;

FIG. 15 is a sectional view similar to FIG. 6 and showing another embodiment (members 432d) of the means shown in FIG. 6 when the base portions 436b of sealing members have been brought to the most advanced position toward the center O of a mandrel extension;

FIG. 16 is a sectional view similar to FIG. 6 and showing the members 432d of FIG. 15 when the sealing member base portions 436b have been retracted from the center O of the mandrel extension;

FIG. 17 is a sectional view similar to FIG. 6 and showing the members 432d of FIG. 15 when the sealing member base portions 436b have been brought to the most retracted position from the center O of the mandrel extension;

DETAILED DESCRIPTION OF THE INVENTION

Figure 1:
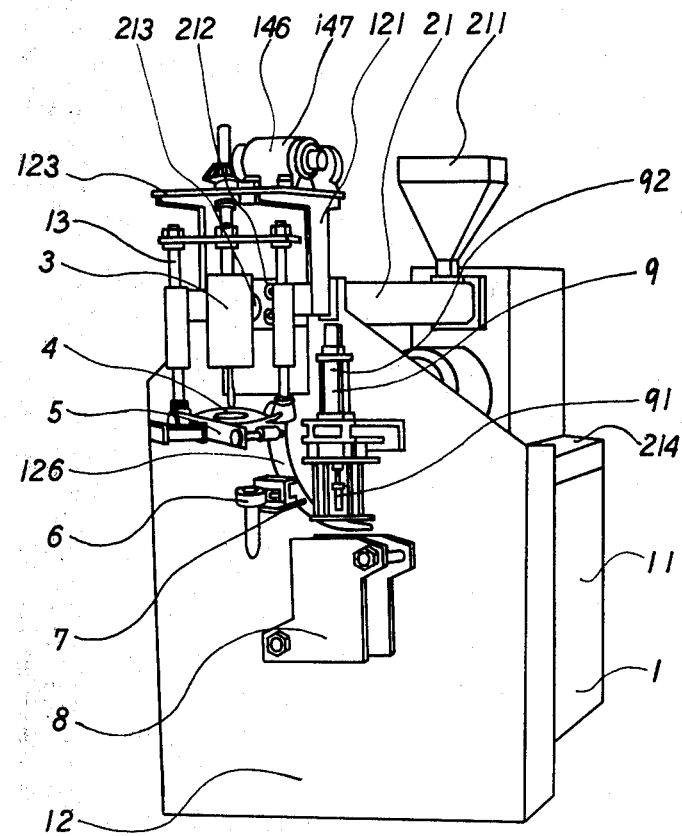
FIG. 1 is a perspective view showing an embodiment of the apparatus for molding hollow bodies according to the method of the invention.

The present invention provides a method of molding hollow bodies by extruding a melt of synthetic resin from a die into a tubular parison, cutting the parison with a cutting blade and blowing a fluid into the cut-off parison retained in a mold, the method being characterized by the successive steps of:

(a) holding the extruded parison from outside at position away from the die outlet in the direction of extrusion, (b) cutting the parison at a position closer to the die than the holding position, and (c) sealing the cut end of the parison continuous with the die to form a bottom.

At least during the cutting of the parison while the parison is being continuously extruded from the die, the parison holding means disposed immediately to the rear of the cutting position is movable with a parison cutter at substantially the same speed in the same direction as the direction of movement of the parison, with the parison holding position and cutting position maintained at a constant spacing relative to each other to thereby prevent improper cutting due to the slackening of the parison. After the parison has been cut, the parison holding means is moved at an increasing spacing from the parison cutter relative thereto so that the following cut end of the parison will not adhere to the preceding end of the cutoff parison. This maintains the parison cut ends in a satisfactory state.

Although the parison holding means is provided independently of the mold according to the construction described, the neck of the mold may be adapted to hold the parison directly, in which case the mold per se serves as the holding means.

Subsequently the parison cutter, bottom forming means for sealing the cut end of the parison to form a bottom and an extension of a mandrel extending through the die are moved at substantially the same speed and in the same direction as the movement of the parison extruded from the die, whereby the excess of the parison for covering the extremity of the mandrel extension can be maintained at a constant required length at all times. To keep the excessive length constant is very critical in filling an accurately proper amount of the material into the space formed between the extremity of the mandrel extension and abutting members fitted thereto in opposed relation.

According to the present invention, the amount of resin to be filled in the space between the extremity of the mandrel extension and the bottom forming abutting members can be maintained at a constant level substantially equal to the volume of the space, so that the arrangement is especially useful for forming a multilayer parison by blow molding. When the parison is bottomed at the die outlet in extrusion blow molding, the layers of the parison become inevitably disturbed at the portion where the resin is finally filled, namely at the bottom portion, even if prior to the extrusion of body portion of the parison, a plurality of resins are concurrently poured into the space corresponding to the bottom portion and defined by a mold.

This is attributable to the fact that when the bottom is formed at the die outlet, the formation of the parison body portion and that of the parison bottom portion are performed discontinuously in repetition at the extrusion outlet, and especially to the fact that when forming the bottom portion, low-viscosity resin tends to precede high-viscosity resin as if covering the latter, with the result that the material finally filled to form the weld at the center of the bottom portion is likely to be composed only of the low-viscosity resin. Thus when a plurality of resins are concurrently poured into the closed mold, it is difficult to form a plurality of continuous layers of uniform thicknesses in a proper arrangement.

With the present molding method, the parison is extruded from the die always under the same conditions in the form of a tubular body of orderly arranged layers and filled in a proper amount into a space of corresponding volume while being forcibly confined therein by sealing members as if thereby being processed additionally. As a result, the arrangement and continuity of the layers as continuously extruded from the die can be maintained satisfactorily.

Further according to the molding method of the invention, the trimming loss which amounts to at least about 30% of the total amount of the extrudate in the usual extrusion blow molding process can be reduced to as small as up to several percent. The scraps resulting from trimming in the multilayer blow molding process contain various kinds of resins and are difficult to recover for reuse. This seriously prevents economical use of materials in multilayer blow molding, whereas the invention has remedied such drawback.

The reduced trimming loss of course gives improved operation efficiency to the molding apparatus also in single-layer blow molding and leads to a reduction in scrap recovery cost, thus resulting in a reduced production cost.

Embodiments of the apparatus for molding hollow bodies according to the method of the invention will be described in detail with reference to the accompanying drawings.

FIG. 1 is a perspective view showing an embodiment of the apparatus for molding hollow bodies according to the method of the invention. The embodiment comprises a single extruder and is adapted for single-layer blow molding.

Indicated at 1 is a molder frame, and at 21 a screw extruder for supplying resin. The resin supplied from a hopper 211 is sent forward through a cylinder (not shown) by a screw (not shown) and forced into a die 3 from a die head 212 through a nozzle 213. In the meantime, the resin is heated and plasticized by a band heater provided around the cylinder.

The screw extruder 21 is provided on the bottom of its support base 214 with wheels (not shown) and is movable axially of the screw by being guided by rails on the support 11 of the molder frame 1.

Figure 2:
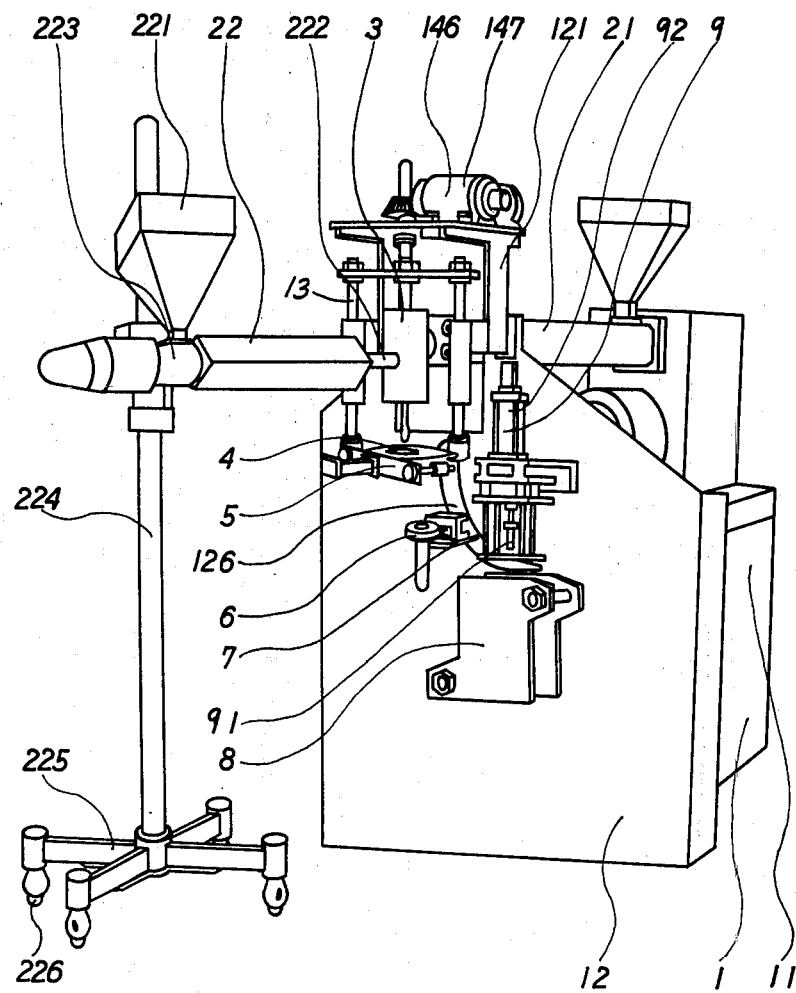
FIG. 2 is a perspective view showing another embodiment of the apparatus for molding hollow bodies according to the method of the invention.

FIG. 2 is a perspective view showing another embodiment of the apparatus for molding hollow bodies according to the method of the invention. This embodiment includes two extruders and is adapted for molding a double-layer parison. The embodiment has, in addition to the screw extruder 21 described with reference to FIG. 1, an auxiliary extruder 22 for plasticizing and feeding a material different in kind, color, etc. from the material supplied by the extruder 21. The two extruders are similar in main construction. The resin supplied from a hopper 221 is sent forward through a cylinder by a screw while being plasticized and fed to a die 3 from a die head (not shown) through a nozzle 222.

The auxiliary screw extruder 22 differs from the screw extruder 21 in the support means for its extrusion unit. The extrusion unit 223 of the auxiliary screw extruder 22 is supported by a post 224 extending upward from a castered frame 225 which is provided on its bottom with casters 226 and is freely movable.

With reference to FIGS. 1 and 2, the molder frame 1 is equipped with a front plate 12 carrying brackets 121 for supporting various means of a parison molding unit. Indicated at 4 is a bottom forming means, at 5 a cutter, at 6 a parison holding means and at 13 a reciprocating assembly.

Figure 3:
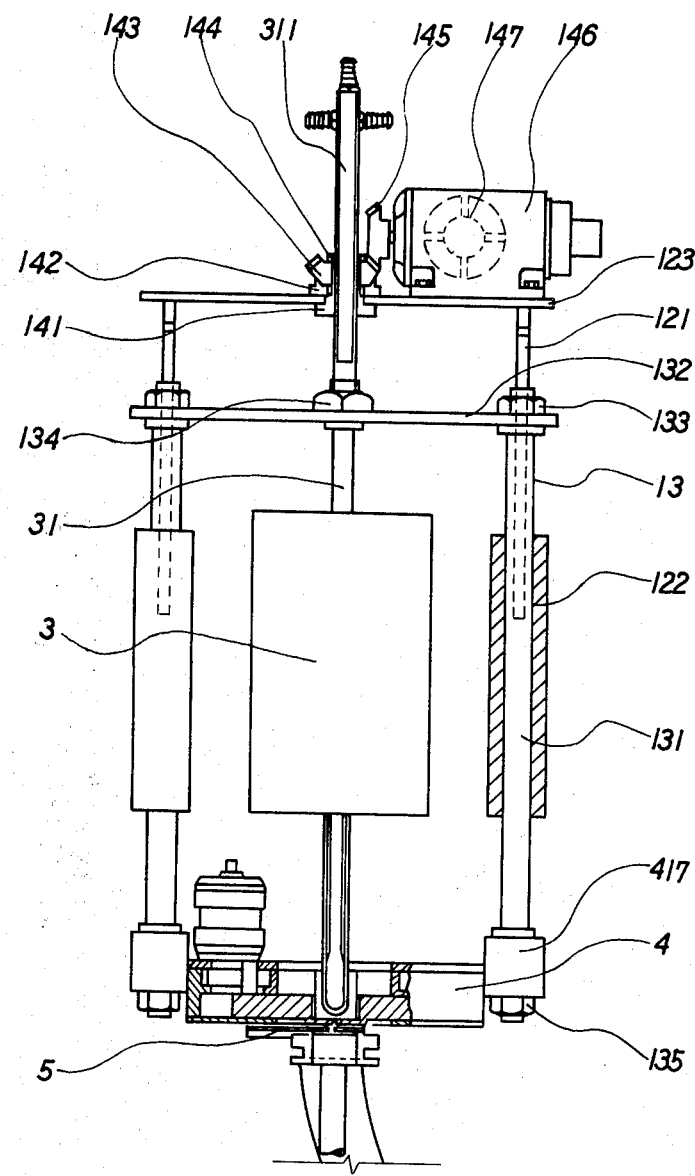
FIG. 3 is an enlarged front view partly in section and showing a die 3 and reciprocating assembly 13 included in the embodiments of FIGS. 1 and 2.

FIG. 3 shows in detail the die 3 and reciprocating assembly 13 in the vicinity of the bracket portion. The brackets 121 are provided with rod guiding cylinders 122 and a top plate 123.

The reciprocating assembly 13 is repeatedly movable downward synchronously with the downward movement of a parison and upward after the required operation has been completed. The reciprocating assembly 13 includes guide bars 131 extending through the guiding cylinder 122 and thereby slidably supported.

A connecting plate 132 is fastened to the upper ends of the guide bars 131 by nuts 133. The lower ends of the guide bars 131 are connected to the bottom forming means 4 and cutter 5. A mandrel 31 extends at its rear portion through the center of the connecting plate 132 and secured thereto by a nut 134. The mandrel 31 is externally threaded at its rear end 311.

An internally threaded member 141 extending through the top plate 123 on the brackets is rotatable relative to the top plate. A nut 142 determines the position of the threaded member 141 axially thereof relative to the top plate 123.

A bevel gear 143 is fitted to the threaded member 141 and held thereto by a key (not shown) not so as to rotate relative to the member 141. The gear is fastened to the member by a nut 144.

A bevel gear 145 is in mesh with the bevel gear 143. The direction of rotation of the rotary shaft to be driven by a speed-variable motor 147 equipped with a reduction gear is reversible as desired by a change-over clutch 146.

Since the externally threaded portion of the mandrel rear end 311 is in screw-thread engagement with the internally threaded rotatable member 141, the motor 147 drives the threaded member 141 through the clutch 146 and bevel gears 145 and 144 to move the mandrel 31 upward or downward. The mandrel 31 is connected at its rear portion to the connecting plate 132, which in turn is connected to the reciprocating assembly 13, so that the assembly 13 is reciprocally movable with the mandrel 31.

Figure 4:
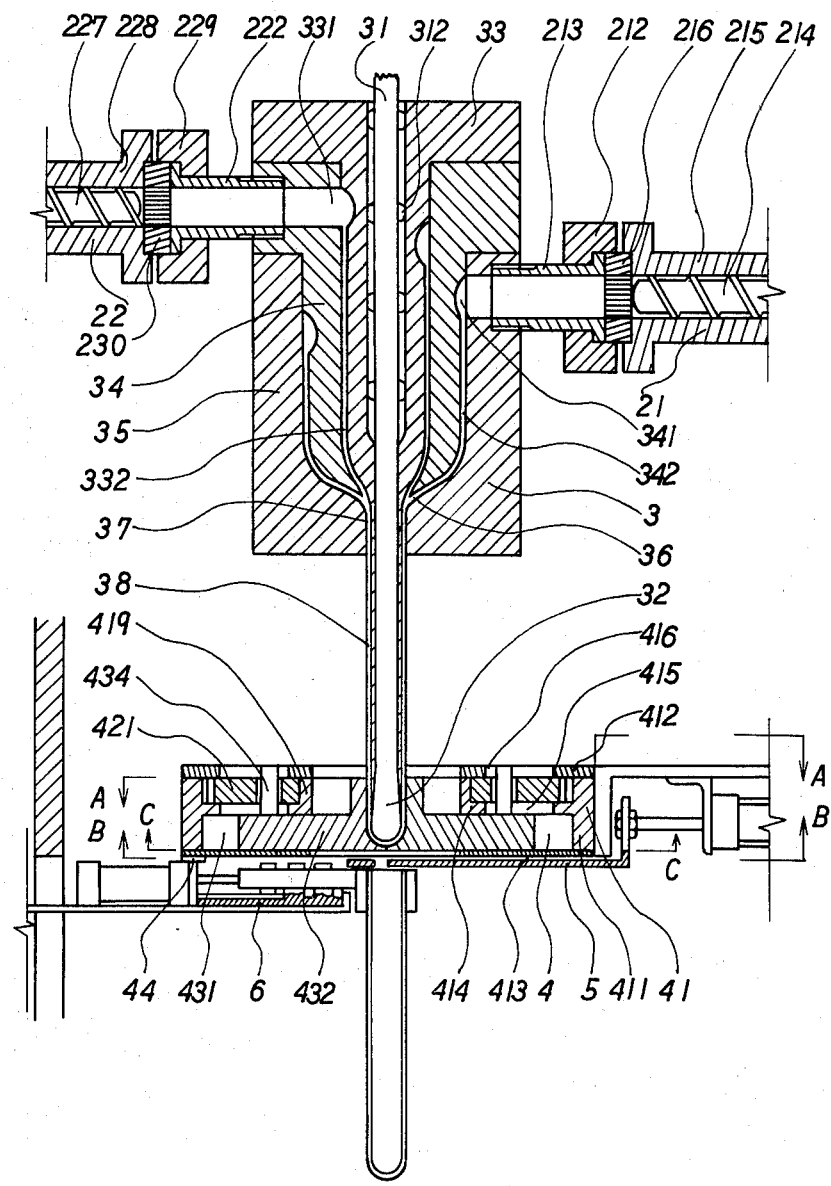
FIG. 4 is an enlarged side elevation partly in section and showing the position of the die 3 relative to forming means 4, cutter 5 and parison holding means 6 in the embodiment of FIG. 2.

FIG. 4 shows the position of the die 3 relative to the forming means 4, cutter 5 and parison holding means 6. Although FIG. 4 shows the embodiment of FIG. 2 adapted for the extrusion of double-layer parisons, the embodiment of FIG. 1 for the extrusion of single-layer parisons has the same arrangement as seen in FIG. 4 except that the die has a simpler construction suitable for single-layer parisons.

FIG. 4 shows the die head 212 of the main screw extruder 21, nozzle 213 of the same, screw 214, cylinder 215 and breaker plate 216. The auxiliary screw extruder 22 has a die head 229, nozzle 222, screw 227, cylinder 228 and breaker plate 230. The die 3 comprises, in addition to the mandrel 31, a first die ring 33, second die ring 34 and third die ring 35.

The resin supplied from the main screw extruder 21 passes through the nozzle 213 and through a manifold 341 provided between the second die ring 34 and the third die ring 35 and flows into a cylindrical channel 342, thus forming an outer flow. The resin supplied from the auxiliary screw extruder 22 passes through the nozzle 222 and then through a manifold 331 provided between the first die ring 33 and the second die ring 34 and flows into a cylindrical channel 332, forming an inner flow.

The two flows combine at a confluence point 36, and the combined flow enters a common channel 37 as a two-layer flow. Although the parison die of the present embodiment is adapted to form a double layer, the resin flow may comprise a single layer or three or more layers.

Figure 18:
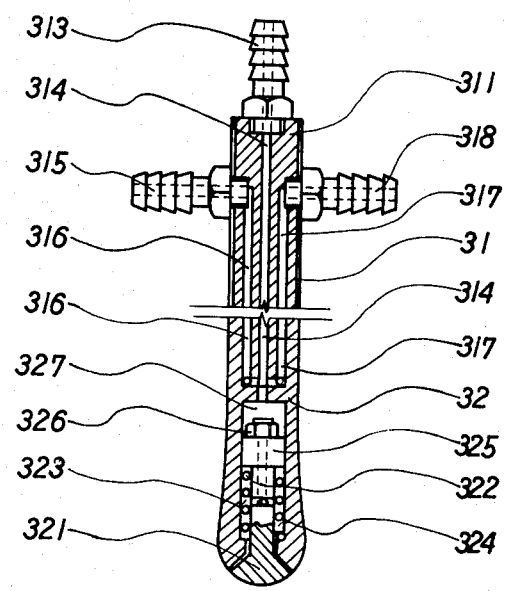
FIG. 18 is an enlarged view in vertical section showing the mandrel illustrated in FIGS. 3 and 4.

The first die ring 33 has a hollow cylindrical center portion. The mandrel 31 is slidable axially thereof with projections 312 on the mandrel 31 in contact with the inner peripheral surface defining the hollow center portion. As seen in FIG. 18, the rear end 311 of the mandrel is provided with an air nipple 313 and air channel 314, and with cold water nipples 315, 318 and cold water channels 316, 317. The front end of the mandrel 31 is a mandrel extension 32 having a semispherical extremity.

The extremity of the mandrel extension 32 includes a mushroom valve 321 having a conical outer end and a piston 325 held to its inner end by a nut 326. The piston 325 is fitted in a hollow cylindrical portion 327 and biased by a spring 322 to close the conical portion. The mushroom valve 321 shown in FIG. 18 has center and radial air channels 323 and 324. When air is forced in through the air nipple 313, the air passes through the air channel 314 into the hollow cylindrical portion 327, exerting pressure on the piston 325 and depressing the valve to its open position, whereupon the air in the hollow portion 327 flows out from the mandrel extension 32 through the channels 323, 324 and through the clearance between the valve disk and seat.

Indicated at 38 in FIG. 4 is a parison formed with a bottom. The air flowing out as above-mentioned flows between the bottom of the parison 38 and the extremity of the mandrel extension 32, releasing the parison 38 from the mandrel extremity. The cold water admitted through the nipple 315 in FIG. 18 flows through the water channels 316 and 317 and is run off from the nipple 318, while cooling the interior of the mandrel extension 32 to prevent the parison forming resin from adhering to the mandrel extension 32. This facilitates the release of the parison 38 from the extension 32.

Figure 5:
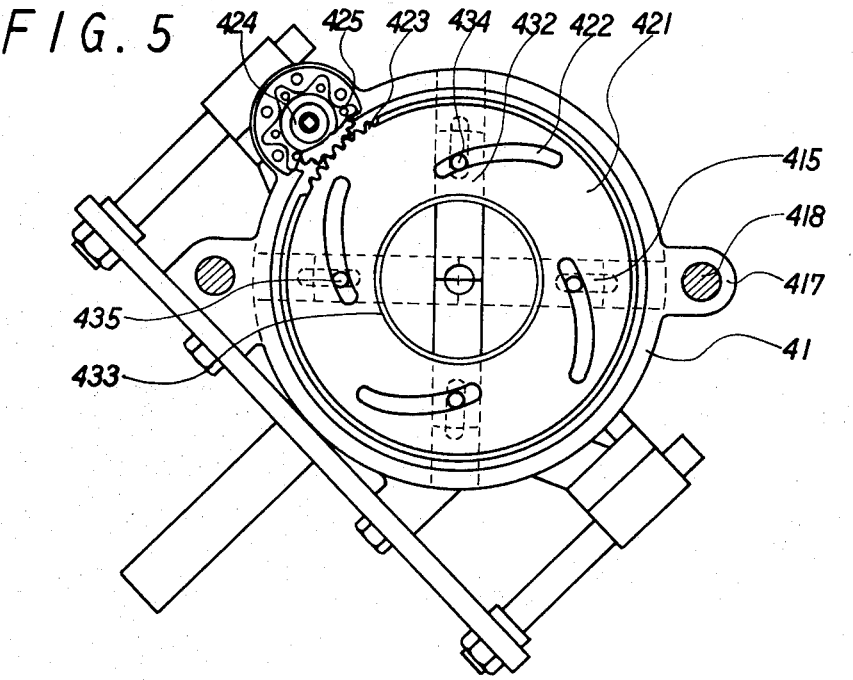
FIG. 5 is a view in cross section taken along the line A—A in FIG. 4.

The means 4 for forming the bottom of the parison shown in FIGS. 4 and 5 has a casing 41 comprising a main body 411, an upper cover 412 and a bottom cover 413. The casing main body 411 has a partition wall 414 formed with radial slits 415. The casing upper cover 412 is also formed with similar slits 416 in corresponding relation to the slits 415. The casing main body 411 has support ears 417 projecting outward therefrom and each having a bore 418 extending therethrough. The lower end of the guide bar 131 (FIG. 3) extends through the bore 418 and secured to the ear 417 by a nut 135 (FIG. 3).

The center portion of the partition wall 414 serves as a cylindrical bearing 419 rotatably supporting a cam gear 421. The gear 421 is toothed as at 423 and has cam slits 422.

A torque actuator 424 which is hydraulically or pneumatically operative has a pinion 425 mounted on its drive shaft. The partition wall 414 is formed in its bottom with radial guide grooves 431 having received therein parison sealing members 432 which are radially slidable. Parison confining members 433 are similarly provided at right angles to the sealing members in a radially slidable manner.

The parison sealing members 432 and parison confining members 433 are provided thereon with pins 434 and 435 respectively. These pins extend through the slits 415, 422 and 416 and are slidable therein in contact with the inner peripheries defining the slits.

FIG. 5 shows the parts during sealing operation. The torque actuator 424 has been turned counterclockwise to its limit position, with both members 432 and 433 brought to the center of the molding apparatus. Thus these members are shown in their closed position.

On completion of the sealing operation, the torque actuator 424 is rotated clockwise in FIG. 5, whereby the pinion 425 connected directly to the actuator is turned clockwise, causing the gear 421 to rotate counterclockwise in meshing engagement with the pinion. The pins 434 and 435 therefore move radially outward from the axis of the molding apparatus by being guided by the cam slits 422. With the outward movement of the pins, the parison sealing members 432 and the parison confining members 433 secured to the pins similarly move radially outward to their open position. This movement, when repeated, forms the bottom of the parison. The parison confining members 433 prevent the cut end of the parison from egressing from the opposed caved ends of the sealing members 432 which move toward each other to form the bottom of the parison with a semispherical cavity defined by the opposed ends. Thus the confining members 433 serve to confine the parison within the cavity.

The parison sealing members may be shaped variously and can be brought into contact with the parison in various ways.

Figure 6:
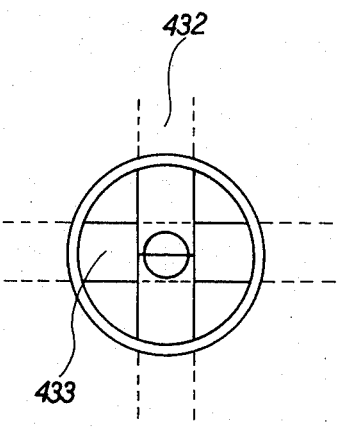
FIG. 6 is a fragmentary view in cross section taken along the line C—C in FIG. 4.
Figure 7:
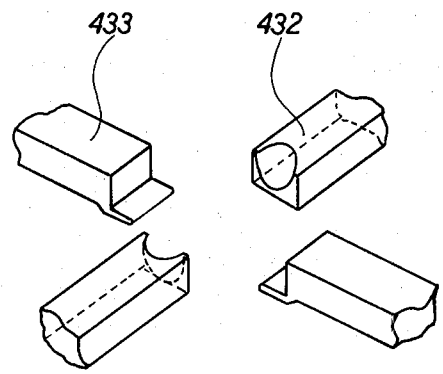
FIG. 7 is an exploded perspective view showing the members 432 and 433 shown in FIG. 6.

The parison sealing members 432 and confining members 433 shown in FIGS. 4 and 5 are illustrated in greater detail in FIGS. 6 and 7. It is seen that the opposed caved ends of the sealing members 432 define a semispherical cavity.

Figure 8:
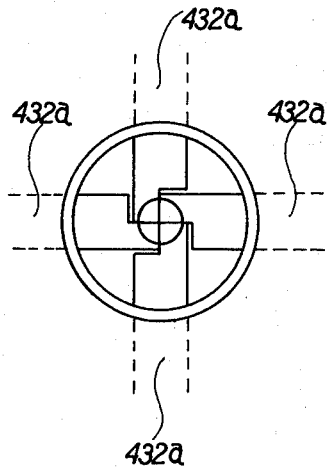
FIG. 8 is a sectional view similar to FIG. 6 and showing another embodiment of the same means (members 432a)
Figure 9:
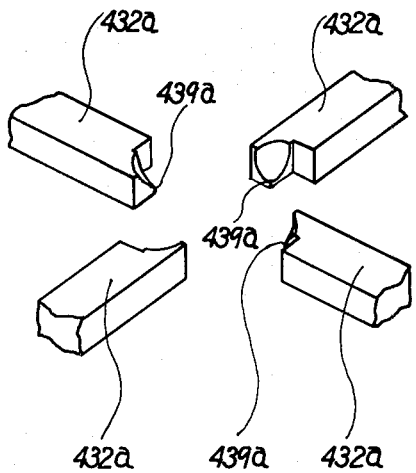
FIG. 9 is an exploded perspective view similar to FIG. 7 and showing the members 432a in FIG. 8.

FIGS. 8 and 9 show a set of four sealing members 432a each of the opposed ends of which is shaped to have an identical quarter of a semispherical form. The four sealing members 432a are arranged radially at equal spacing and are movable radially inward. Since the sealing members 432a thus arranged are adapted to advance toward the center with their lowermost portions 439a of their caved surfaces brought to the center, the egress of the molten resin from the junction between the members can be minimized when the members are brought together end to end.

FIGS. 10 to 12 show another embodiment of the sealing means composed of sealing members 432b. Each of the sealing members 432b comprises a base portion 436 and a free end portion 439 attached to the base portion 436. The base portion 436 has a pin 438 engaging in a hole formed in the casing bottom cover 413. A guide pin 437 on the upper surface of the base portion 436 is engaged in the cam slit 422 and is movable by being thereby guided. Thus the sealing members 432b are turnable about the pins 438.

FIGS. 10 and 11 show the parts after the cam gear 421 has been turned in a counterclockwise direction in the drawing. When the gear is so rotated, the free ends 439 of the sealing members move away from the center of the mandrel extension (shown in FIG. 11) with the turn of the base portions 436, thus defining a polygonal space concentric with the parison and having sides equal to the sealing members in number.

FIG. 12 shows the parts after the cam gear 421 has been turned in a clockwise direction in the drawing. When the gear is so turned, the free ends 439 of the sealing members move toward the center of the mandrel extension 32 with the movement of the base portions 436, thereby constricting the cut end of the parison from outside against the bottom of the mandrel extension, whereby the cut end of the parison is sealed to form a bottom.

FIGS. 13 and 14 show another embodiment of the sealing means, comprising sealing members 432c. Pins 434 and 435 are movable toward the center O of the mandrel extension 32 radially thereof by the rotation of the cam gear 421 while being guided by cam slits 422. Sealing member base portions 436a connected to the pins 434 are each provided with a free end portion 439b of thin plate having a concave edge. The free end portions 439b are adapted for contact with one another in an overlapping relation.

FIG. 13 shows the sealing member base portions 436a as brought to the most retracted position from the center O of the mandrel extension by the cam gear 421 which has been turned in a counterclockwise direction in the drawing to the greatest possible extent. The cam gear 421, when rotated in a clockwise direction in the drawing, causes the pins 434 and 435 to advance the sealing members 432c toward the center O of the mandrel extension 32 and forcing the members to press the parison against the bottom of the mandrel extension. Consequently the parts are brought to the position shown in FIG. 14.

FIGS. 15 to 17 show another embodiment of the sealing means, comprising sealing members 432d. Sealing member base portions 436b are each provided with a free end portion 439c in the form of a square thin plate having a circular aperture punched out. The free end portions 439c are adapted for contact with one another in an overlapping relation.

FIG. 15 shows the sealing member base portions 436b as most advanced toward the center O of the mandrel extension. In this position, the circular apertures of the free end portions 439c are in register, with their circular peripheries positioned most remote from the center O of the mandrel extension 32.

FIG. 16 shows the sealing member base portions 436b as retracted radially outward from the center O. The envelope provided by the edges defining the circular apertures of the free end portions 439c has been greatly reduced.

FIG. 17 shows the sealing member base portions 436b as retracted further radially outward to their limit position. The envelope has converged to a point.

Each of the sealing means shown in FIGS. 10 to 12, FIGS. 13 and 14 and FIGS. 15 to 17 comprises a plurality of thin plates servings as sealing member free ends 439, 439b or 439c and adapted to overlap one another in contact to surround the parison. These sealing member free end portions 439, 439b and 439c, when sealing, come into contact with the parison and eventually press the parison against the bottom of the mandrel extension in a confining fashion. The end edges of the free end portions 439, 439b and 439c define a quasi-polygon having continuous curved sides surrounding the parison. The term "polygon" as used herein comprehends not only those composed of straight sides but also those composed of not straight sides. Even when the end portions are so positioned that the quasi-polygon is larger than the cross section of the parison, the sides of the polygon are circumferentially continuous.

The sealing members 432 or 432a shown in FIGS. 6 to 9, when brought toward each other into end-to-end contact with each other, are likely to permit the deposition of the melt of synthetic resin in the space therebetween, whereas the sealing members 432b, 432c and 432d shown in FIGS. 10 to 12, FIGS. 13 and 14 and FIGS. 15 to 17 confine the parison within the bottom forming space without permitting such deposition. Accordingly the bottom of the parison formed will have no flash-like sealing traces. These sealing members therefore have the advantage that when pressing the parison against the bottom of the mandrel extension 32, they act uniformly on the parison in every radial direction with continuous edges. The uniform sealing operation can be ensured with improved effectiveness with an increase in the number of the sealing members used.

In the embodiments of FIGS. 9 to 17, the extremity of the mandrel extention is not necessarily semispherical, or rather, preferablly flat in shape as shown in FIG. 11. Also, the mandrel extension is useful for forming the bottom of the parison without creases, but is not essential requirement for sealing the cut end of the parison.

The molding operation with the apparatus described above will not produced scraps which would usually result when parisons are nipped off by the pinch portion of the mold but forms a neat bottom without disturbing the layers of the parison formed in an orderly fashion. The parison must be cut to a length which adequately forms a bottom between the extremity of the mandrel extension 32 and the parison sealing members 432, 432a, 432b, 432c and 432d. This assurs that the parison will have a bottom of uniform thickness and neat appearance without any overflow or lack of synthetic resin. That is to say, in the embodiments of FIGS. 6 to 9 the parison must be cut to a length which adequately fills the space between the extremity of the mandrel extension and the sealing member 432 without any overflow or lack of synthetic resin. Also, in the embodiments of FIGS. 10 to 17 the parison must be cut to such a length that the sealing members 432a, 432b, 432c and 432d can press the cut end of the parison by reducing the envelope provided by continuous edges to form the bottom of the parison without any overflow or lack of synthetic resin.

The sealing members 432 and 432a shown in FIGS. 6 to 9 are useful for forming the bottom of the parison having uniform thickness and no crease since these sealing members can engage closely with the bottom portion of the parison. However, the sealing members 432 and 432a, when brought toward each other into end-to-end contact with each other, are likely to deposit the melt of synthetic resin in the space therebetween. On the contrary, the sealing members 432b, 432c and 432d shown in FIGS. 10 to 17 can press the parison uniformly in every radial direction toward the center of the mandrel extension 32 with continuous edges. Since each of these sealing members comprises thin plate, these sealing members cannot engage closely with the bottom portion of the parison.

Consequently, simultaneously when or sometime after the sealing member 432b, 432c or 432d is employed as preparatory means for forming shown in FIGS. 10 to 17 the bottom of the parison, the sealing member 432 or 432a shown in FIGS. 6 to 9 is employed, the obtained bottom of the parison is more beautiful in appearance than that formed by employing the sealing member 432b, 432c or 432d or the sealing member 432 or 432a alone.

Figure 19:
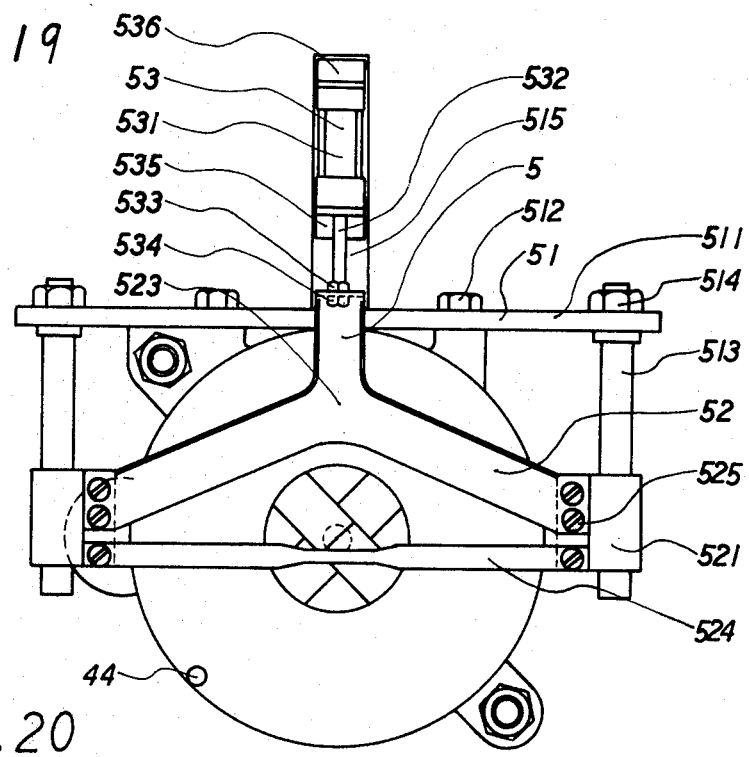
FIG. 19 is a view in cross section taken along the line B—B in FIG. 4.
Figure 20:
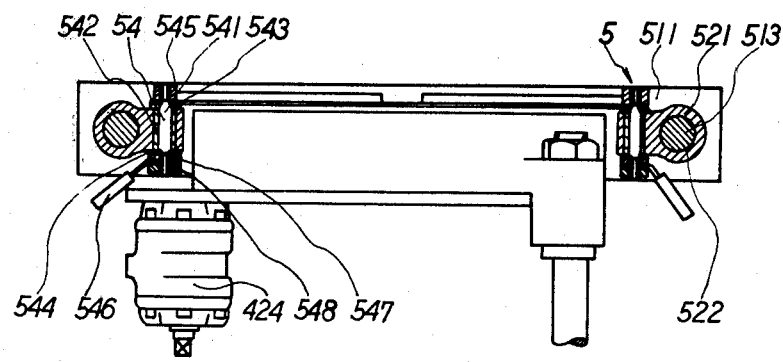
FIG. 20 is a side elevation partly in section showing the cutter 5 of FIG. 19.

FIG. 19 and 20 show the cutter 5. A cutter holder 51 is in a fixed position relative to the bottom forming means 4. A holding plate 511 is secured to the casing main body 411 of the forming means 4 (shown in FIG. 4) by bolts 512. Guide bars 513 are fastened to the holding plate 511 by nuts 514. Indicated at 52 is a reciprocating portion. The guide bars 513 extend through the bores 522 of sliders 521, which are therefore slidable thereon axially thereof. A connecting plate 523 has one end secured to the rod 532 of an air cylinder 53 by nuts 533 and 534. Indicated at 531 is the main body of the air cylinder, and at 535 and 536 are air cylinder bases which are fixed to a rear portion 515 of the holding plate. Indicated at 524 is a cutter blade. The connecting plate 523 is secured to the sliders 521 by bolts 525.

FIG. 20 shows means 54 for passing current, bolts 541, insulator tubes 542 and insulating washers 53 and 544. The cutting blade 524 is mounted on the sliders 521 by bolts 541 and nuts 545. Electric wires 546 are connected to the other ends of the bolts 541 by nuts 547 and 548. Current is passed through the cutting blade 524 to heat the same. The cutting means is especially suitable for cutting low-viscosity resin such as polypropylene or nylon.

With referance to FIGS. 4 and 19, a stopper 44 is provided on the bottom of the forming means 4, namely on the bottom of the bottom cover of the casing. It must be disposed outside the traversing region of the reciprocating portion 52.

Figure 21:
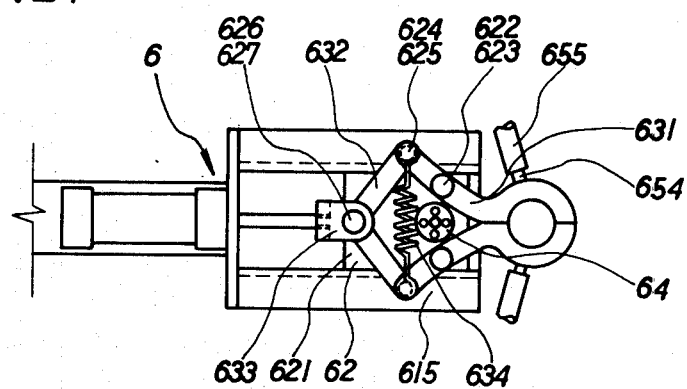
FIG. 21 is a plan view showing the parison holding means 6 of FIG. 4.
Figure 22:
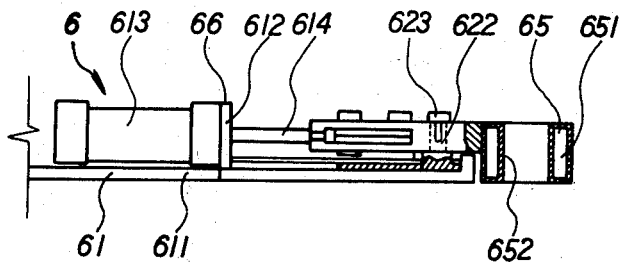
FIG. 22 is a side elevation partly in section and showing the parison holding means 6 of FIG. 21.
Figure 23:
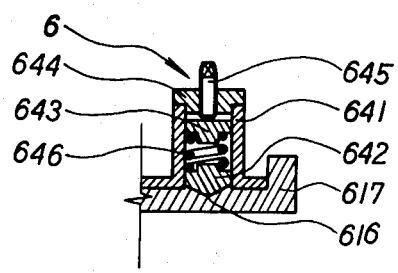
FIG. 23 is an enlarged view in vertical section showing the engaging means 64 of the parison holding means 6 of FIG. 21.

FIGS. 21 to 23 show a parison holder 6. A base plate 61 for the holder comprises a base plate main body 611 and a support plate 612 perpendicular thereto and supporting an air cylinder 613. A sliding plate 62 is reciprocally slidable on the upper face of the main body 611. The base 621 of the sliding plate 62 is provided with pivots 622 supporting arms 631. Bolts 623 turnably retain the arms 631 on the pivots 622.

Each of the arms is pivotably connected by a pin 624 to one end of a link 632 and retained thereon by a bolt 625. The other end of the link 632 is connected to a movable member 633 by a pin 626 and retained thereon by a bolt 627. The movable member 633 is secured to the forward end of the rod 614 of the air cylinder 613. A spring 634 has opposite ends fixedly wound on and secured to the two pins 624 and biases the pins toward each other.

The slide plate 62 carries engaging means 64 comprising a cylinder 641 on the base 621, and engaging piece 642 fitting in the cylinder 641, a position adjusting piece 643 above the piece 642, a cover 644 covering the cylinder, a spring 646 provided between the engaging piece 642 and the position adjusting piece 643, and a pushing bolt 645 which is adjustable to adjust the pressure of the spring 646. Indicated at 616 is a notch in which the projection of the engaging piece 642 is engageable when the sliding plate is brought to its advanced position. A stopper 617 limits the advance of the sliding plate. The sliding plate 621 is reciprocally movable axially of the air cylinder 613 while being guided by restraining guide plates 615.

Indicated at 65 is a holder for holding parisons. The holder has an annular vacuum chamber 651 comprising two divided segments each formed with suction holes 652 in its inner peripheral surface. The vacuum chamber 651 is provided on its outer periphery with nipples 654 connected by rubber tubes 655 to a vacuum source (not shown).

The holding means 6 operates in the following manner. FIG. 21 shows the holder 65 in its closed position with the rod 614 of the air cylinder, namely the movable member 633, in its advanced position. When the rod 614 starts to retract, the spring 634 starts to contract, moving the pins 624 toward each other and turning the arms 631 about the pivots 622 to open the holder.

As the rod 614 further retracts, the engaging piece 642 of the engaging means 64 comes out of engagement with the notch 616, and the assembly including the sliding plate 62 and holder 65 also retracts. During retraction and in the retracted position of the assembly, the holder is held open at all times by the spring 634 in its contracted state.

When the rod 614 starts to advance upon lapse of a period of time, the holder held in its open position advances with the sliding plate 62 until the front end of the base 621 comes into abutting contact with the stopper 617, whereupon the slide plate 62 stops. At this time, the engaging piece 642 of the engaging means 64 comes into engagement with the notch 616.

With a further advance of the rod 614, the pins 624 are forced away from each other, overcoming the tension of the spring 634 and turning the arms 631 about the pivots 622 to close the holder. The operation described is repeated.

Figure 24:
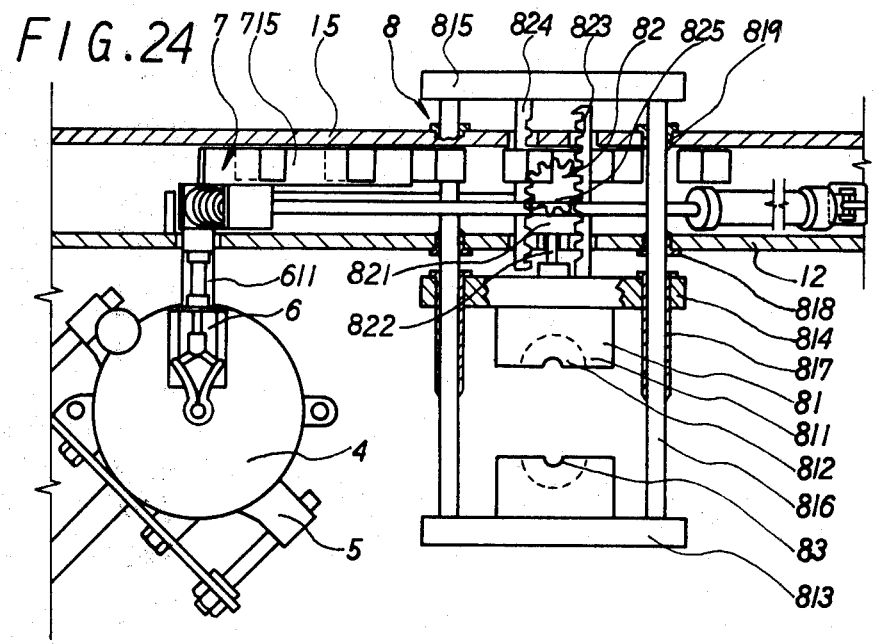
FIG. 24 is an enlarged plain view partly in section of part of the embodiments of FIGS. 1 and 2 to show a parison carriage 7 and mold clamp 8.
Figure 25:
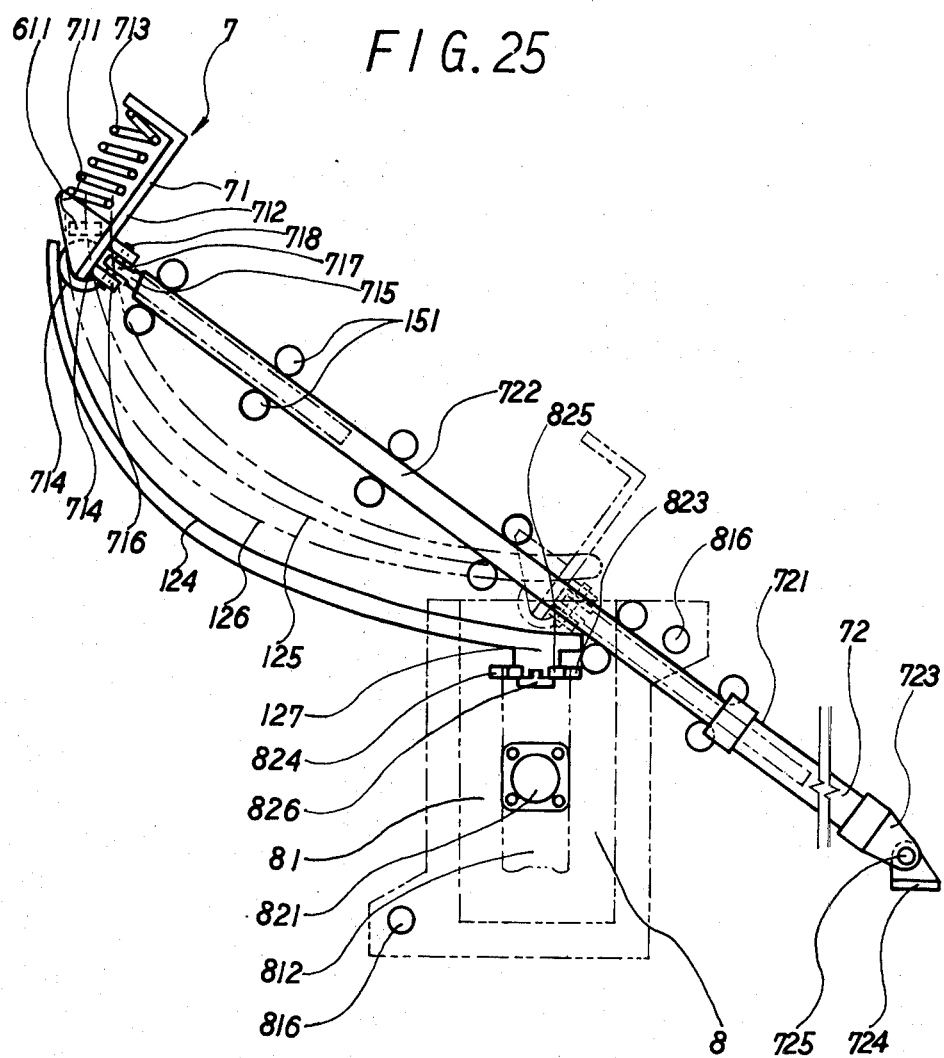
FIG. 25 is a front view showing the main parts of the carriage 7 and mold clamp 8 of FIG. 24.

FIGS. 24 and 25 show a parison carriage 7 and a mold clamp 8.

The base plate main body 611 of the parison holding means is joined to a follower 711 of a carriage main body 71 having a frame 712. The frame 712 has one end opposed to the follower 711 with a spring 713 provided between the frame 712 and the follower 711. The spring 713 biases the follower. The follower 711 is reciprocally movable on the frame 71 axially of the spring 713 by guide means (not shown). The follower 711 has a wheel 714.

A cam plate 124 is mounted on the front plate 12 of the molder frame 1. The carriage main body 71 is provided with a guide plate 715 nipped between pairs of rollers 151 on a rear plate 15 of the molder frame. The rollers 151 are freely rollable in light contact with the guide plate 715.

Projecting from the rear face of the carriage main body 71 is a bracket 716 which is connected by a pin 718 to a connecting piece 717 on the forward end of a rod 722 of a hydraulic cylinder 72 including a main body 721. A pivotable support member 723 is mounted by a pin 725 on a fixed member 724 on the molder frame 1.

FIGS. 24 and 25 show the carriage main body 71 in its most advanced position with the rod 722 of the hydraulic cylinder 72 in its advanced position. When the rod 722 starts to retract, the carriage main body 71 retracts straight along with the guide plate 715 nipped between the rollers 151. During retraction, the driven member 711 slides along on the frame 712 axially of the spring 713 with the wheel 714 on the follower guided by the cam plate 124.

Since the base plate main body 611 of the carriage 7 is secured to the driven member 711, the center of the section of the main body 611 moves along the path indicated in the two-dot-and-dash line 125. In the initial stage of this movement, the path 125 may preferably be in the same direction as the movement of the bottom forming means 4 and cutter 5. It is also desirable that in the final stage of the movement, the path 125 be in parallel to the upper surface of a mold 81 although this is not a critical requirement. The most retracted position of the carriage main body 71 is indicated in two-dot-and-dash lines in FIG. 25. The front plate 12 of the molder frame 1 must be formed with an aperture 126 for fully permitting the base plate 61 to move along the path 125.

The mold 81 mounted on the mold clamp 8 comprises two mold halves 811 defining a mold cavity 812 for forming the contour of the article to be molded. A front platen 813 and rear platen 814 carry the two separate mold halves 811 respectively. A connecting platen 815 interconnects two die bars 816.

Bushes 817, 818 and 819 extend through the rear platen 814, front plate 12 and rear plate 15 respectively to support the tie bars 816. As illustrated, the bushes 817 are elongated coaxially with the tie bars 916 to guide the bars.

Mold drive means 82 comprises a hydraulic cylinder 821 mounted on the front plate 12 and having a rod 822 attached to the rear platen 814. A rack 823 is attached to a rear portion of the rear platen 814, and another rack 824 to the connecting platen 815.

A boss 127 is formed on the lower portion of the terminal end of the cam plate 124 and is provided with a pinion 825 meshing with the racks 823 and 824 opposed to each other. A bolt 826 retains the pinion 825 in position.

FIG. 24 shows the mold in its opened position. The rod 822 of the hydraulic cylinder 821, when advanced, advances the rear platen 814, moving the mold half on the rear platen 814 forward. With this movement, the rack 823 on the rear platen also advances, rotating the pinion 825 in a clockwise direction in FIG. 24 and retracting the rack 824 on the connecting platen 815. Since the rack 824 is coupled to the front platen 813 by the platen 815 and tie bars 816, the front platen 813 also retracts.

Through the operation described above, the mold halves 811 are fitted together to form a closed mold with its center maintained in a definite position.

The mold halves 811 have recesses 83 which, when the mold is closed, form a circular bore corresponding to the neck of the container to be molded.

A mandrel drive means 9 (see FIGS. 1 and 2) has an air cylinder 92, which when operated drives a mandrel 91 into the container neck portion to finish the inner periphery of the neck portion with accuracy. By being pressed on by the mandrel 91, the resin fully enter the recesses 83, forming the neck portion with high dimensional accuracy.

The apparatus for molding hollow bodies according to the method of the invention embodied as above will operate in the following order.

The resin melted and plasticized by the extruders is forced out from the die 3 as a parison. The parison is extruded at a speed corresponding to the feed capacity of the extruder. In the meantime, the mandrel extension 32, bottom forming means 4 and cutter 5 are driven in the direction of advance of the parison synchronously with the speed of extrusion of the parison by adjusting the speed of rotation of the motor 147 which drives the reciprocating assembly.

Subsequently the parison is held by the holding means 6 by bringing the holder 65 behind the parison to a position concentrical therewith, closing the holder and applying suction to the parison.

Simultaneously with the holding of the parison or with a slight time delay, the parison is cut by advancing or retracting the reciprocating portion 52 to move the cutting blade 524 across the parison.

Simultaneously with or some time after the completion of the cutting operation, a bottom is formed on the cut off parison by operating the torque actuator 424 to advance the parison and sealing members 432 toward the axis of the parison and seal the cut open end thereof. When the mandrel extension 32 and the members 433 and 432 are cooled with water or air when forming the parison, the parison is releasable with ease. For the release of the parison with greater ease, it is desirable to operate the mushroom valve 321 at the extremity of the mandrel extension to project the valve disk and blow out air.

Simultaneously when or some time after the parison bottom has been released from the extremity of mandrel extension, the mandrel extension 32, bottom forming means 4 and cutter 5 are moved in the opposite direction to the direction of advance of the parison. In the meantime, the torque actuator 424 is driven in the reverse direction to the above-mentioned operating direction to retract the parison confining members 433 and sealing members 432.

On the other hand, as the reciprocally movable assembly including the mandrel extension 32, bottom forming means 4 and cutter 5 continues to move synchronously with the movement of the parison in the same direction as the parison, the stopper 44 on the bottom of the bottom forming means 4 finally comes into contact with the top 66 of the support plate 612 of the parison holding means 6. The parison must be hold by the holder and then cut preferably promptly after this contact has taken place. It is also desirable that the carriage be initiated into operation immediately after the completion of cutting.

Simultaneously with the contact of the stopper 44 with the top 66 of the support plate 612 during the movement of the reciprocating assembly with the movement of the parison, the parison holding means is pushed by the reciprocating assembly and starts to move synchronously therewith. At the start of this movement, the holding means 6 is adapted to move in the same direction as the movement of the parison. Stated more specifically, the base plate 61 of the holding means 6 moves as connected to the follower 711 of the carriage main body which slides along the cam plate 124 by means of the wheel 714 and the path of movement of which is in the same direction as the movement of the parison in the initial stage.

While the holding means is moving synchronously with the reciprocating assembly by thereby being pushed, the parison must be cut. The holding means should further be moved preferably promptly after the completion of the cutting operation, so that the cut lower end of the continuously descending parison will not come into contact with the upper end of the cut off piece of parison again. During the period following the contact of the reciprocating assembly until the carriage 7 is initiated into movement, the hydraulic cylinder 72 is free of pressure in either direction, with the result that the holding means connected by the rod 722 to the hydraulic cylinder is free to move when pushed by the reciprocating assembly. After the parison has been cut, however, the hydraulic cylinder 72 starts to operate, causing the carriage 7 to drive the holding means toward the mold 81.

With the parison brought to a position between the two mold halves 811, the hydraulic cylinder 821 of the mold clamp 82 functions, advancing the rear platen 814. This movement is delivered to the front platen 813 through the rack 823, pinion 825, rack 824, connecting platen 815 and tie bars 816, thus driving the front platen 813 toward the parison synchronously with the rear platen 814, whereby the mold 81 is closed.

When the mold 81 is closed, air is supplied to the interior of the holder 65 of the holding means 6 to eliminate the suction. The air cylinder 613 subsequently operates to open the holder 65.

The mandrel 91 is forced by the drive means 9 into the parison whose upper end is held by the recessed portions 83 of the mold halves 811 now fitted together. When air is blown into the parison through the interior of the mandrel 91, the parison is inflated with the air pressure and formed in conformity with the shape of the mold cavity. The molded product solidifies on cooling since the mold is internally cooled.

The hydraulic cylinder 821 is then operated in the reverse direction to the above to open the mold 81. The air forced through the mandrel releases the molded article from the mold, allowing the article to fall off.

The molding cycle described will be repeated in the same order.

Although the cut off parison is held by the holding means and transferred to the position of the mold clamp by the carriage in the above description, the parison can be held by the mold per se on the clamp which may be carried by a carriage to the same positions as the above-mentioned clamp. This arrangement, however, requires greater energy to rapidly transfer the heavy mold clamp and necessitates shock absorbing means when halting the mold clamp.

Further according to the embodiment described, the reciprocating assembly for the mandrel extension, bottom forming means and cutter is reciprocated by a speed variable motor which rotates a screw in combination with mechanical means for changing the direction of the upward or downward movement, i.e. a change-over clutch.

The reciprocating movement may be effected mechanically by the use of a rack and a pinion or a cam in place of the screw. Hydraulic or pneumatic means may be similarly useful. Especially when a hydraulic cylinder is mounted on the top plate 123 of the bracket with its piston rod connected to the reciprocating assembly, and the rod movement is made controllable by a programmed system, the arrangement will be more advantageous over the mere change of direction of the constant-speed movement described because the reciprocating assembly is readily controllable optimally with respect to position and speed under the conditions determined as desired.

What we claim is:
1. In a method of molding a hollow body by:
 (a) continuously extruding downwardly into free space a melt of synthetic resin from a die thereby forming a moving tubular parison having a free end;
 (b) closing and sealing the free end with a means for forming a bottom thereby forming a closed end on the parison;
 (c) holding the parison with a means for holding;
 (d) cutting the parison with a means for cutting thereby forming a cut-off tube with the closed end; and
 (e) blowing a fluid into the cut-off tube retained in a mold thereby forming said hollow body;
the improvement wherein:
 (1) steps b-d are performed in a successive order of (c) holding, (d) cutting, and (b) sealing;
 (2) the die accommodates a mandrel extendable in the direction of extrusion to provide a mandrel extension having an end;
 (3) the means for forming a bottom comprises a frame surrounding the path of movement of the parison, sealing members circumferentially spaced about the frame and radially movable, and means for moving said sealing members, and the step of closing and sealing comprises moving said sealing members from outside the parison toward its center, bringing said sealing members into contact with each other while filling the resin of the free end into a space provided between said end of said mandrel extension and said sealing members to form the closed end which is a bottom;

(4) the means for holding holds the portion of the moving parison which becomes the cut-off tube by its outside surface and is positioned at a distance away from the die in the direction of extrusion, the means for cutting is positioned between the die and the means for holding, and the means for forming a bottom is positioned between the means for cutting and the die; and (5) the method further comprises during the steps of cutting and sealing, moving the means for forming a bottom, the means for cutting, the means for holding, and said mandrel extension at substantially the same speed and in substantially the same direction as the movement of the parison extruded from the die.

2. The method as defined in claim 1 wherein said sealing is accomplished by reducing continuously an opening provided by continuous edges of said sealing members confining the parison.

3. The method as defined in claim 2 wherein each of said sealing members at least at the extremity thereof includes a plurality of thin plates disposed axially of the parison.

4. The method as defined in claim 1 wherein said sealing is carried out with said end of said mandrel extension being introduced into the parison by forcing said sealing members to press the free end of the parison against said end of said mandrel extension.

5. The method as defined in claim 1 wherein the cut-off tube held by the means for holding is transferred from the cutting position to a space between mold halves.

6. The method as defined in claim 5 wherein the cut-off tube held by the means for holding is transferred initially in substantially the same direction as the movement of the parison, and the speed of the transfer is equal to or higher than the speed of movement of the parison.

7. The method as defined in claim 1 wherein the means for holding is a neck of a mold.

8. The method as defined in claim 1 wherein a plurality of plasticized resins are fed to the die with use of a plurality of extruders to extrude a parison having a plurality of layers.

* * * * *